(12) United States Patent
Liu et al.

(10) Patent No.: US 12,339,797 B2
(45) Date of Patent: Jun. 24, 2025

(54) MULTI-CHIP INTERCONNECTION SYSTEM AND METHOD THEREOF

(71) Applicant: Nanjing SemiDrive Technology LTD., Nanjing (CN)

(72) Inventors: Xiongfei Liu, Nanjing (CN); Qiaoyu Ye, Nanjing (CN); Shaohui Gong, Nanjing (CN); Lihang Zhang, Nanjing (CN)

(73) Assignee: Nanjing SemiDrive Technology LTD., Nanjing (CN)

( * ) Notice: Subject to any disclaimer, the term of this patent is extended or adjusted under 35 U.S.C. 154(b) by 184 days.

(21) Appl. No.: 18/159,951

(22) Filed: Jan. 26, 2023

(65) Prior Publication Data
US 2024/0012775 A1 Jan. 11, 2024

(30) Foreign Application Priority Data
Jul. 11, 2022 (CN) .......................... 202210809908.1

(51) Int. Cl.
*G06F 13/362* (2006.01)
*G06F 13/40* (2006.01)
*G06F 13/42* (2006.01)
*G06F 15/78* (2006.01)

(52) U.S. Cl.
CPC ........ *G06F 13/362* (2013.01); *G06F 13/4282* (2013.01)

(58) Field of Classification Search
CPC ............... G06F 13/362; G06F 13/4282; G06F 13/4027; G06F 13/4068; G06F 15/7807; Y02D 10/00
(Continued)

(56) References Cited

U.S. PATENT DOCUMENTS 10,078,568 B1    9/2018   Stoler et al.
10,275,259 B1 *   4/2019   Jain ...................... G06F 9/4411
(Continued)

FOREIGN PATENT DOCUMENTS

WO     2021075302 A1    4/2021

OTHER PUBLICATIONS

The European Patent Office (EPO) The Extended European Search Report for 23164368.5 Nov. 6, 2023 10 Pages.
(Continued)

*Primary Examiner* — Idriss N Alrobaye
*Assistant Examiner* — Henry W Yu
(74) *Attorney, Agent, or Firm* — ANOVA LAW GROUP, PLLC

(57) ABSTRACT

A multi-chip interconnection system includes a plurality of chips. A chip of the plurality of chips includes an extend serial peripheral interface (XSPI) master terminal, a data transmission terminal, an XSPI slave terminal, and a data reception terminal. The XSPI master terminal includes an advanced extensible interface (AXI) slave interface. The data transmission terminal accesses the AXI slave interface via an AXI bus. The XSPI slave terminal includes an AXI master interface. The data reception terminal accesses the AXI master interface via the AXI bus. An XSPI master terminal of a chip is connected to an XSPI slave terminal of another chip via an XSPI bus. The XSPI master terminal of the chip performs encoding on AXI information of the data transmission terminal of the chip received via the AXI bus and transmits encoded AXI information to the XSPI slave terminal of the another chip via the XSPI bus.

15 Claims, 4 Drawing Sheets

(58) Field of Classification Search
USPC .................... 710/2, 15, 20, 30, 62, 105, 110
See application file for complete search history.

(56) References Cited

U.S. PATENT DOCUMENTS

| | | | |
|---|---|---|---|
| 11,392,533 B1* | 7/2022 | Guo | G06F 13/4282 |
| 2013/0046909 A1* | 2/2013 | Huang | G06F 13/4022 |
| | | | 710/110 |
| 2015/0323956 A1* | 11/2015 | Goyal | G06F 11/0745 |
| | | | 713/600 |
| 2017/0242813 A1* | 8/2017 | Manikfan | G06F 13/364 |
| 2019/0096813 A1* | 3/2019 | Lesea | G06F 15/7892 |
| 2020/0354069 A1* | 11/2020 | Zhao | G05D 1/101 |
| 2022/0012190 A1* | 1/2022 | Cheng | G06F 13/4282 |
| 2022/0261370 A1 | 8/2022 | Otsuka | |

OTHER PUBLICATIONS

Prateek Shantharama et al., "Hardware-Accelerated Platforms and Infrastructures for Network Functions: A Survey of Enabling Technologies and Research Studies", IEEE Access, IEEE, USA, vol. 8, Jul. 9, 2020 (Jul. 9, 2020), pp. 132021-132085.

Nico Giangiacomi et al. "General Purpose Readout Board $\pi$ LUP: Overview and Results" IEEE Transactions on Nuclear Science 66.7 (2019): 1021-1027.

Xilinx: "Zynq-7000 All Programmable SoC Technical Reference Manual UG585 (v1. 10) Feb. 23, 2015", Internet Citation, Jan. 22, 2016 (Jan. 22, 2016), pp. 1-207.

* cited by examiner

MULTI-CHIP INTERCONNECTION SYSTEM AND METHOD THEREOF

CROSS-REFERENCE TO RELATED APPLICATION

The present disclosure claims priority to Chinese Patent Application No. 202210809908.1, filed on Jul. 11, 2022, the entire content of which is incorporated herein by reference.

TECHNICAL FIELD

The present disclosure generally relates to the semiconductor technology field and, more particularly, to a multi-chip interconnection system and a method thereof.

BACKGROUND

With increasing demands from a market, for example, in automotive electronics, increasingly complex systems on chip (SOCs) are developed to satisfy requirements of intelligent cockpit, assisted driving, autonomous driving. A SOC is integrated with different processors, which support running a plurality of operating systems. An interconnection method is required to be high-efficient and safe between chips to satisfy the complexity and variety of the system.

Currently, the chip interconnection method often uses a complex and expensive block as a basic setup. In complex and various systems, different requirements are imposed on the performance of the chip interconnection. Thus, a simple, high-efficient, and safe chip interconnection solution is needed.

SUMMARY

Embodiments of the present disclosure provide a multi-chip interconnection system including a plurality of chips. A chip of the plurality of chips includes an extend serial peripheral interface (XSPI) master terminal, a data transmission terminal, an XSPI slave terminal, and a data reception terminal. The XSPI master terminal includes an advanced extensible interface (AXI) slave interface. The data transmission terminal accesses the AXI slave interface via an AXI bus. The XSPI slave terminal includes an AXI master interface. The data reception terminal accesses the AXI master interface via the AXI bus. An XSPI master terminal of a chip is connected to an XSPI slave terminal of another chip via an XSPI bus. The XSPI master terminal of the chip performs encoding on AXI information of the data transmission terminal of the chip received via the AXI bus and transmits encoded AXI information to the XSPI slave terminal of the another chip via the XSPI bus. The XSPI slave terminal of the another chip performs decoding on the encoded AXI information to obtain the AXI information and transmits the AXI information to the data reception terminal of the another chip via the AXI bus. The XSPI slave terminal of the another chip performs encoding on AXI feedback information of the data reception terminal of the another chip received via the AXI bus and transmits the encoded AXI feedback information to the XSPI master terminal of the chip. The XSPI master terminal of the chip performs decoding on the encoded AXI feedback information to obtain the AXI feedback information and transmits the AXI feedback information to the data transmission terminal of the chip via the AXI bus.

Embodiments of the present disclosure provide a multi-chip interconnection method. The method includes performing, by an XSPI master terminal of a chip, encoding on AXI information of a data transmission terminal of the chip received via an AXI bus and transmits encoded AXI information to an XSPI slave terminal of another chip via an XSPI bus, performing, by the XSPI slave terminal of the another chip, decoding on the encoded AXI information to obtain the AXI information and transmits the AXI information to a data reception terminal of the another chip via the AXI bus, performing, by the XSPI slave terminal of the another chip, encoding on AXI feedback information of the data reception terminal of the another chip received via the AXI bus and transmits the encoded AXI feedback information to the XSPI master terminal of the chip, and performing, by the XSPI master terminal of the chip, decoding on the encoded AXI feedback information to obtain the AXI feedback information and transmitting the AXI feedback information to the data transmission terminal of the chip via the AXI bus.

Embodiments of the present disclosure provide a non-transitory computer-readable storage medium stores a computer instruction and, when the computer instruction is executed, a processor is caused to perform, by an XSPI master terminal of a chip, encoding on AXI information of a data transmission terminal of the chip received via an AXI bus and transmits encoded AXI information to an XSPI slave terminal of another chip via an XSPI bus, perform, by the XSPI slave terminal of the another chip, decoding on the encoded AXI information to obtain the AXI information and transmits the AXI information to a data reception terminal of the another chip via the AXI bus, perform, by the XSPI slave terminal of the another chip, encoding on AXI feedback information of the data reception terminal of the another chip received via the AXI bus and transmits the encoded AXI feedback information to the XSPI master terminal of the chip, and perform, by the XSPI master terminal of the chip, decoding on the encoded AXI feedback information to obtain the AXI feedback information and transmits the AXI feedback information to the data transmission terminal of the chip via the AXI bus.

In the multi-chip interconnection system and method of the present disclosure, the data transmission terminal is connected to the XSPI through the AXI bus, and the data reception terminal is connected to the XSPI master terminal. The XSPI slave terminal is connected to the XSPI master terminal through the XSPI bus. Thus, the complexity and development cost of the overall system can be reduced. The system can also have a large extension space.

Other features and advantages of the present disclosure are described in the description below. Some of the features and advantages become apparent in the description or may be learned by implementing the disclosure.

BRIEF DESCRIPTION OF THE DRAWINGS

The following drawings are merely examples for illustrative purposes according to various disclosed embodiments and are not intended to limit the scope of the present disclosure.

of a multi-chip interconnection according to some embodiments of the present disclosure.

Figure 4:
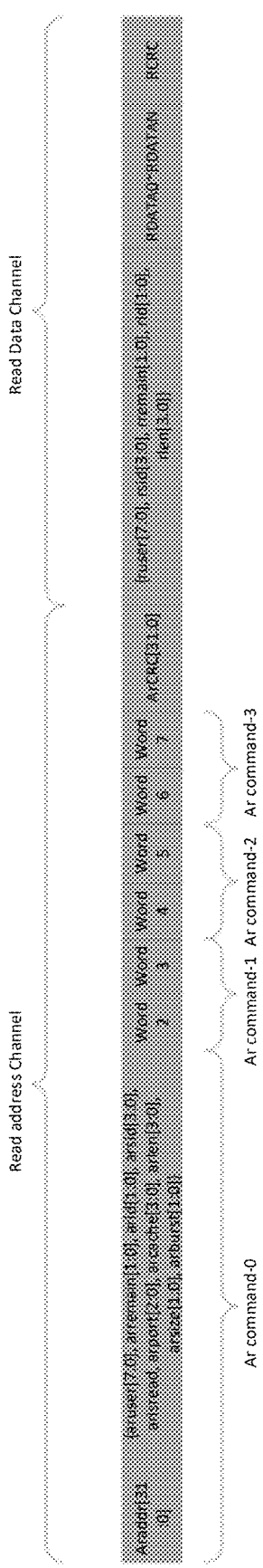

FIG. 4 illustrates a schematic diagram showing an implementation of reading outstanding of an AXI bus of a multi-chip interconnection according to some embodiments of the present disclosure.

DETAILED DESCRIPTION OF THE EMBODIMENTS

Embodiments of the present disclosure are described in detail below with reference to the accompanying drawings. Although the drawings show certain embodiments of the present disclosure, however, the present disclosure can be implemented in various forms and should not be limited to the embodiments described here. These embodiments are provided for a more thorough and complete understanding of the present disclosure. The drawings and embodiments of the present disclosure are exemplary and are not used to limit the scope of the present disclosure.

Various steps described in method embodiments of the present disclosure can be performed in different orders and/or in parallel. In addition, method embodiments can include additional steps and/or steps that are omitted for performing the illustration. The scope of the present disclosure is not limited to this aspect.

The term "including" and variations thereof as used herein are open-ended inclusions, i.e., "including but not limited to." The term "according to" means "at least partially according to." Relevant definitions of other terms are given in the description below.

The modification of "one" and "a plurality of" mentioned in the present disclosure is illustrative rather than restrictive. Those skilled in the art should understand that unless otherwise clearly indicated in the context, "one" should be understood as "one or more," and "a plurality of" should be understood as two or more.

Embodiments of the present disclosure are described in detail with reference to the accompanying drawings below.

Figure 1:
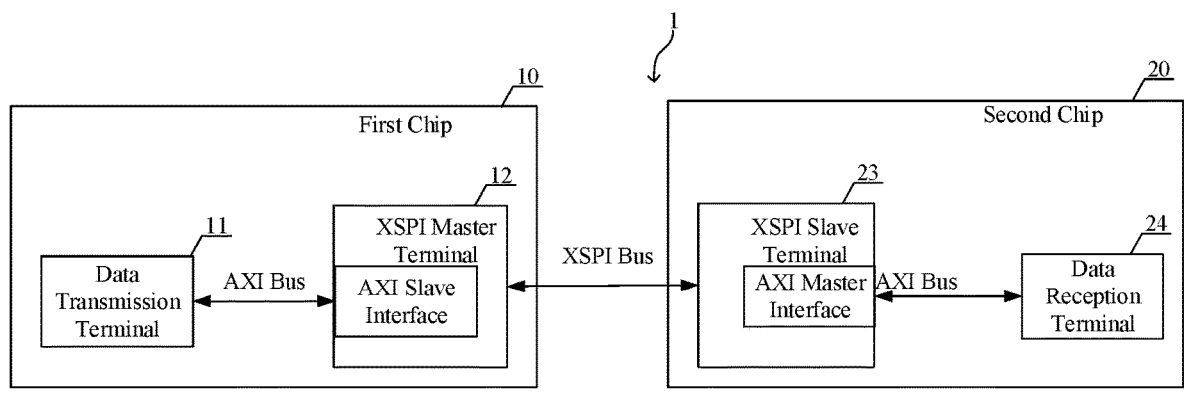
FIG. 1 illustrates a schematic structural diagram of a multi-chip interconnection system according to some embodiments of the present disclosure.

FIG. 1 illustrates a schematic structural diagram of a multi-chip interconnection system 1 according to some embodiments of the present disclosure. As shown in FIG. 1, the multi-chip interconnection system 1 of the present disclosure includes a first chip 10 and a second chip 20.

The first chip 10 may include a data transmission terminal 11, an extend serial peripheral interface (XSPI) master terminal 12, an XSPI slave terminal (not shown), and a data reception terminal (not shown). The XSPI master terminal 12 may include a slave interface of an advanced extensible interface (AXI). That is, the AXI can be a bus protocol, and the slave interface can be a slave interface of the bus protocol (i.e., an AXI slave interface). The data transmission terminal 11 can access the AXI slave interface through the AXI bus. Since the XSPI slave terminal and the data reception terminal of the first chip 10 are same as those of the second chip 20, the XSPI slave terminal and the data reception terminal can be described in detail below.

The second chip 20 can include a data transmission terminal (not shown), an XSPI master terminal (not shown), an XSPI slave terminal 23, and a data reception terminal 24. The XSPI slave terminal 23 can include an AXI master interface (i.e., a bus protocol master interface). The data reception terminal 24 can access the AXI master interface through the AXI bus. Since the data transmission terminal and the XSPI master terminal of the second chip 20 are the same as those of the first chip 10, the specific description of the data transmission terminal and the XSPI master terminal is omitted.

The XSPI master terminal 12 of the first chip 10 can be connected to the XSPI slave terminal 23 of the second chip 20 through the XSPI bus.

When the first chip 10 and the second chip 20 need to be interconnected, the data transmission terminal 11 of the first chip 10 can transmit AXI information to the XSPI master terminal 12 through the AXI bus. After receiving the AXI information, the XSPI master terminal 12 of the first chip 10 can encode the AXI information. The XSPI master terminal 12 of the first chip 10 can transmit encoded AXI information to the XSPI slave terminal 23 of the second chip 20 through the XSPI bus. After receiving the encoded AXI information, the XSPI slave terminal 23 of the second chip 20 can decode the encoded AXI information to obtain the AXI information. The XSPI slave terminal 23 of the second chip 20 can transmit the AXI information obtained by decoding to the data reception terminal 24 of the second chip 20 through the AXI bus.

After receiving the AXI information, the data reception terminal 24 of the second chip 20 can transmit AXI feedback information to the XSPI slave terminal 23 of the second chip 20 through the AXI bus. After receiving the AXI feedback information, the XSPI slave terminal 23 of the second chip 20 can encode the AXI feedback information. The XSPI slave terminal 23 of the second chip 20 can transmit the encoded AXI feedback information to the XSPI master terminal 12 of the first chip 10 through the XSPI bus. After receiving the encoded AXI feedback information, the XSPI master terminal 12 of the first chip 10 can decode the encoded AXI feedback information to obtain the AXI feedback information. The XSPI master terminal 12 of the first chip 10 can transmit the AXI feedback information obtained by decoding to the data transmission terminal 11 of the first chip 10 through the AXI bus.

Figure 3:
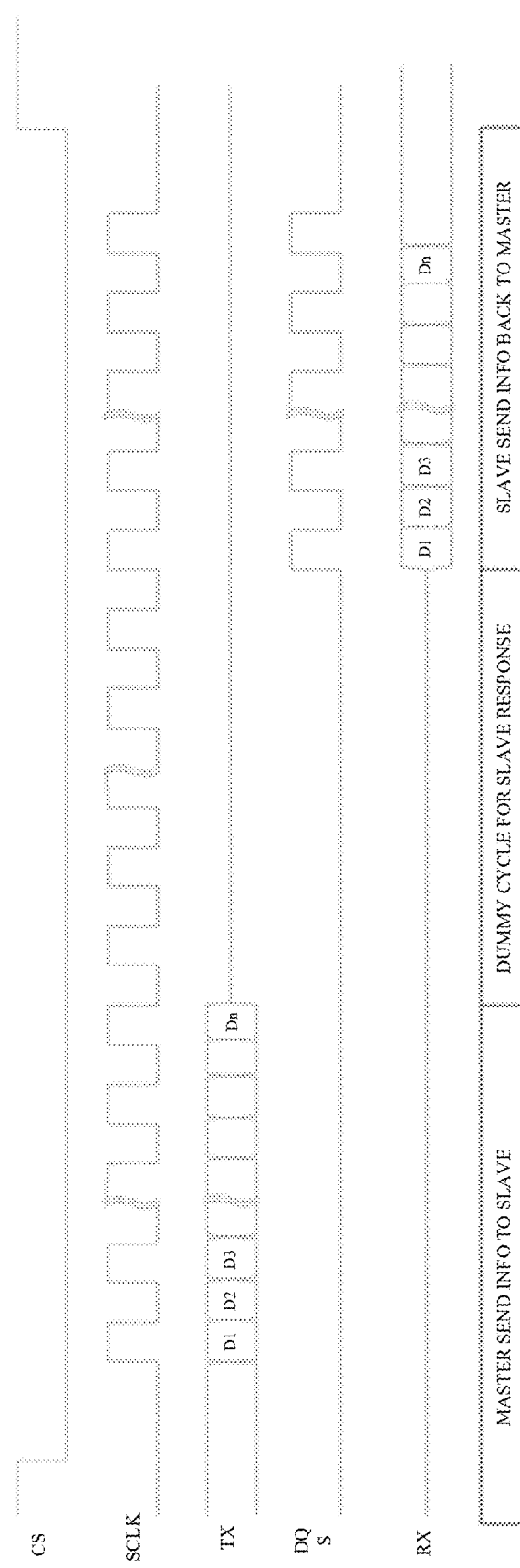
FIG. 3 illustrates a schematic diagram showing a time sequence of an XSPI bus dynamic dummy (void instruction)

FIG. 3 illustrates a schematic diagram showing a time sequence of an XSPI bus dynamic dummy (void instruction) of a multi-chip interconnection according to some embodiments of the present disclosure. As shown in FIG. 3, when the first chip 10 and the second chip 20 are interconnected, time for the XSPI master terminal 12 of the first chip 10 to access the data reception terminal 24 of the second chip 20 is uncertain. Thus, the dummy cycle (void instruction cycle) of the XSPI bus is also uncertain. The data reception terminal 24 of the second chip 20 cannot receive the data to be transmitted by the data reception terminal 24 according to a fixed dummy cycle set for the data transmission terminal 11 of the first chip 10. To solve the above problem, the XSPI slave terminal 23 of the second chip 20 or the XSPI slave terminal of the first chip 10 can have a data strobe (DQS) function. The DQS function can be a data selection pulse function. In addition, the XSPI master terminal 12 of the first chip 10 can transmit the encoded AXI information and wait for the DQS sent by the data reception terminal 24 of the second chip 20. When a specified amount of data is received, the data can be transmitted. When the data reception terminal 24 of the second chip 20 does not respond within a specified time, a timeout mechanism can be triggered to avoid hang-up of the XSPI master terminal 12 of the first chip 10 caused by the XSPI slave terminal 23 of the second chip 20 accessing slave terminals of other chips.

In addition, the encoded AXI information can include AXI write, which can include a write address channel and a write data channel, and AXI read, which can include a read address channel. The encoded AXI feedback information can include AXI write, which can include a write response channel, and AXI read, which can include a read data channel.

FIG. 4 illustrates a schematic diagram showing an implementation of reading outstanding of the AXI bus of the multi-chip interconnection according to some embodiments of the present disclosure. As shown in FIG. 4, each ar command consists of 2 words, including all information of the AXI read address channel in SPI transaction. Arremain [1:0] is used to indicate how many AXI read transactions exists after the SPI transaction. Thus, when the data reception terminal 24 of the second chip 20 receives the first ar command, whether the transmission is outstanding and how much AXI transaction exists have been known. In addition, arsid and rsid can be used to indicate different AXI transaction to ensure the read address channel matches the read data channel for each AXI read transaction.

In addition, special protection of the data in the SPI bus transaction process, for example, can use a more common cyclic redundancy check (CRC). Verification can be performed according to different channels of the AXI. For example, the versification can be performed according to ArCRC[31:0] and Rcrc[31:0] shown in FIG. 4.

In addition, the multi-chip interconnection system 1 of embodiments of the present disclosure can include a timeout mechanism for the application scenario. The data transmission terminal 11 of the first chip 10 and the data reception terminal 24 of the second chip 20 each can have a timeout mechanism. Timeout interrupt of the data reception terminal 24 of the second chip 20 can be directly transmitted to the data transmission terminal 11 of the first chip 10 through a PAD (pin) port.

When the transmission time of the data transmission terminal 11 of the first chip 10 exceeds a timeout threshold, the data transmission terminal 11 of the first chip 10 can continue to select the data reception terminal 24 of the second chip 20, stop transmitting clock to the data reception terminal 24 of the second chip 20, and disconnect the transmission after maintaining the timeout threshold.

In addition, when a selection signal is selected, and a time period for not receiving the clock of the data transmission terminal 11 of the first chip 10 exceeds the time-out threshold, the data reception terminal 24 of the second chip 20 can disconnect the transmission.

In the above manner, failure causes of the timeout can be determined as follows.
 (1) When the data transmission terminal 11 of the first chip 10 times out after the data reception terminal 24 of the second chip 20 times out, it indicates that the data reception terminal 24 of the second chip 20 can be correctly selected, and the timeout interrupt can be correctly triggered and transmitted.
 (2) When the data transmission terminal 11 of the first chip 10 and the data reception terminal 24 of the second chip 20 time out simultaneously, it indicates that the data reception terminal 24 of the second chip 20 can be correctly selected, however, the clock of the data transmission terminal 11 of the first chip 10 cannot be transmitted to the data reception terminal 24 of the second chip 20.
 (3) When the data transmission terminal 11 of the first chip 10 times out, and the data reception terminal 24 of the second chip 20 does not time out, it indicates that the data reception terminal 24 of the second chip 20 cannot be selected, or the timeout interrupt cannot be correctly triggered and transmitted.

According to the multi-chip interconnection system of embodiments of the present disclosure, the data transmission terminal and the XSPI master terminal can be connected by the AXI bus, the data reception terminal and the XSPI slave terminal can be connected by the AXI bus, and XSPI master terminals and XSPI slave terminals of different chips can be connected by the XSPI bus. Thus, the complexity and the development time of the chip can be reduced to further lower the cost. In addition, the XSPI protocol can support all linear performance enhancement methods. Further, the performance of XSPI can be enhanced according to the actual performance requirements (for example, the clock frequency, DQS, and DDR can be increased, and parallel port data lines can be added, etc.) to solve the different performance requirements of the system.

According to the multi-chip interconnection system of embodiments of the present disclosure, a response problem of the main data reception terminal can be solved through the DQS function.

According to the multi-chip interconnection system of embodiments of the present disclosure, by having the timeout mechanism and easily and effectively determining the failure causes of the timeout, the safety performance can be increased, and a debug (failure elimination) mechanism can be provided to ensure that the interconnection can be performed normally.

In some embodiments, the example in which the multi-chip interconnection system includes two chips is described. However, the multi-chip interconnection system can include more than two chips.

Figure 2:
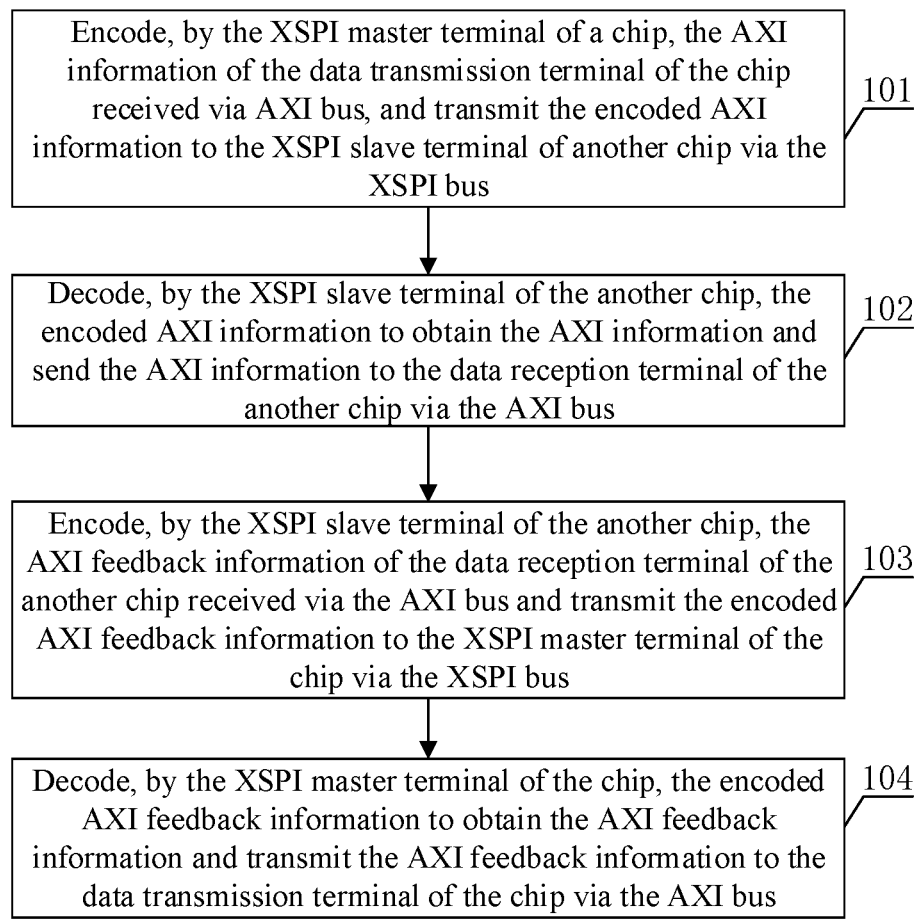
FIG. 2 illustrates a schematic flowchart of a multi-chip interconnection method according to some embodiments of the present disclosure.

FIG. 2 illustrates a schematic flowchart of the multi-chip interconnection method according to some embodiments of the present disclosure. Referring to FIG. 2, the multi-chip interconnection method of the present disclosure is described in detail below.

At 101, the XSPI master terminal of a chip encodes the AXI information of the data transmission terminal of the chip received via the AXI bus, and transmits the encoded AXI information to the XSPI slave terminal of another chip via the XSPI bus.

At 102, the XSPI slave terminal of the another chip decodes the encoded AXI information to obtain the AXI information and send the AXI information to the data reception terminal of the another chip via the AXI bus.

At 103, the XSPI slave terminal of the another chip encodes the AXI feedback information of the data reception terminal of the another chip received via the AXI bus and transmits the encoded AXI feedback information to the XSPI master terminal of the chip via the XSPI bus.

At 104, the XSPI master terminal of the chip decodes the encoded AXI feedback information to obtain the AXI feedback information and transmits the AXI feedback information to the data transmission terminal of the chip via the AXI bus.

When the chip is interconnected to the another chip, the time when the XSPI master terminal of the chip can access the data reception terminal of the another chip is uncertain. Thus, the dummy cycle of the XSPI bus can be also uncertain. The data reception terminal of the another chip cannot receive the data to be transmitted according to a fixed dummy cycle set for the data transmission terminal of the chip. To solve the above problem, the XSPI slave terminal of the another chip can have a data strobe (DQS) function. In addition, after transmitting the encoded AXI information, the XSPI master terminal of the chip can wait for the DQS sent by the data reception terminal of the another chip. When a specified amount of data is received, the data can be transmitted. When the data reception terminal of the another chip does not respond within a specified time, a timeout mechanism can be triggered to avoid hang up of the XSPI master terminal of the chip caused by the XSPI slave terminal of the another chip accessing slave terminals of other chips.

In addition, the encoded AXI information can include AXI write, which can include a write address channel and a write data channel, and AXI read, which can include a read address channel. The encoded AXI feedback information can include AXI write, which can include a write response channel, and AXI read, which can include a read data channel.

In addition, the data transmission terminals and the data reception terminals of different chips each can have a timeout mechanism. Timeout interrupt of the data reception terminal of the another chip can be directly transmitted to the data transmission terminal of the chip through a PAD (pin) port.

When the transmission time of the data transmission terminal of the chip exceeds a timeout threshold, the data transmission terminal of the chip can continue to select the data reception terminal of the another chip, stop transmitting clock to the data reception terminal of the another chip, and disconnect the transmission after maintaining the timeout threshold.

In addition, when a selection signal is selected, and a time period for not receiving the clock of the data transmission terminal of the chip exceeds the time-out threshold, the data reception terminal of the another chip can disconnect the transmission.

According to the multi-chip interconnection system of embodiments of the present disclosure, the data transmission terminal and the XSPI master terminal can be connected via the AXI bus, the data reception terminal and the XSPI slave terminal can be connected via the AXI bus, and XSPI master terminals and XSPI slave terminals of different chips can be connected via the XSPI bus. Thus, the complexity and the development time of the chip can be reduced to further lower the cost. In addition, the XSPI protocol can support all linear performance enhancement methods. Further, the performance of XSPI can be enhanced according to the actual performance requirements (for example, the clock frequency, DQS, and DDR can be increased, and parallel port data lines can be added, etc.) to solve the different performance requirements of the system.

According to the multi-chip interconnection system of embodiments of the present disclosure, a response problem of the main data reception terminal can be solved through the DQS function.

According to the multi-chip interconnection system of embodiments of the present disclosure, by having the timeout mechanism and easily and effectively determining the failure causes of the timeout, the safety performance can be increased, and a debug (failure elimination) mechanism can be provided to ensure that the interconnection can be performed normally.

Embodiments of the present disclosure further provide a vehicle chip, which includes the multi-chip interconnection system of the present disclosure.

Embodiments of the present disclosure further provide an electronic device, which includes the vehicle chip of the present disclosure.

Embodiments of the present disclosure further provide a computer-readable storage medium, which stores a computer instruction. When the computer instruction is executed, the multi-chip interconnection method of the present disclosure can be executed.

Those of ordinary skill in the art should understand that the above is only some embodiments of the present disclosure and does not limit the present disclosure. Although the present disclosure is described in detail with reference to embodiments of the present disclosure, modifications can be made to the technical solution of embodiments of the present disclosure, or an equivalent replacement can be made to some technical features. Any modification, equivalent replacement, and advancement made within the spirit and principle of the present disclosure should be included in the scope of the present disclosure.

What is claimed is:

1. A multi-chip interconnection system comprising a first chip and a second chip, the first chip and the second chip each including:
   an extend serial peripheral interface (XSPI) master terminal including an advanced extensible interface (AXI) slave interface;
   a data transmission terminal accessing the AXI slave interface via an AXI bus;
   an XSPI slave terminal including an AXI master interface;
   a data reception terminal accessing the AXI master interface via the AXI bus;
   wherein:
      the XSPI master terminal of the first chip is connected to the XSPI slave terminal of the second chip via an XSPI bus;
      the XSPI master terminal of the first chip performs encoding on AXI information of the data transmission terminal of the first chip received via the AXI bus of the first chip and transmits the encoded AXI information to the XSPI slave terminal of the second chip via the XSPI bus;
      the XSPI slave terminal of the second chip performs decoding on the encoded AXI information to obtain the AXI information and transmits the AXI information to the data reception terminal of the second chip via the AXI bus of the second chip;
      the XSPI slave terminal of the second chip performs encoding on AXI feedback information of the data reception terminal of the second chip received via the AXI bus of the second chip and transmits the encoded AXI feedback information to the XSPI master terminal of the first chip via the XSPI bus;
      the XSPI master terminal of the first chip performs decoding on the encoded AXI feedback information to obtain the AXI feedback information and transmits the AXI feedback information to the data transmission terminal of the first chip via the AXI bus of the first chip; and
      after the XSPI master terminal of the first chip transmits the encoded AXI information, the XSPI master terminal of the first chip waits for at least one data strobe (DQS) transmitted by the data reception terminal of the second chip, the at least one DQS and the transmission of the encoded AXI feedback information at least partially overlap in time.

2. The system according to claim 1, wherein:
   in response to receiving a specified amount of data, data is transmitted; and
   in response to the data reception terminal of the second chip not responding within a specified time, a timeout mechanism is triggered.

3. The system according to claim 1, wherein:
the encoded AXI information includes AXI write, including a write address channel and a write data channel, and AXI read, including a read address channel; and
the encoded AXI feedback information includes AXI write, including a write response channel, and AXI read, including a read data channel.

4. The system according to claim 1, wherein:
in response to transmission time of the data transmission terminal of the first chip exceeding a timeout threshold, the data transmission terminal of the first chip continues to select the data reception terminal of the second chip, stops transmitting clock to the data reception terminal of the second chip, and disconnects transmission after maintaining the timeout threshold.

5. The system according to claim 1, wherein:
in response to the selection signal being selected and a time length for not receiving the clock of the data transmission terminal of the first chip exceeding the timeout threshold, the data reception terminal of the second chip disconnects transmission.

6. A multi-chip interconnection method comprising:
performing, by an XSPI master terminal of a first chip, encoding on AXI information of a data transmission terminal of the first chip received via an AXI bus of the first chip and transmits the encoded AXI information to an XSPI slave terminal of a second chip via an XSPI bus;
performing, by the XSPI slave terminal of the second chip, decoding on the encoded AXI information to obtain the AXI information and transmits the AXI information to a data reception terminal of the second chip via an AXI bus of the second chip;
performing, by the XSPI slave terminal of the second chip, encoding on AXI feedback information of the data reception terminal of the second chip received via the AXI bus of the second chip and transmits the encoded AXI feedback information to the XSPI master terminal of the first chip via the XSPI bus; and
performing, by the XSPI master terminal of the first chip, decoding on the encoded AXI feedback information to obtain the AXI feedback information and transmitting the AXI feedback information to the data transmission terminal of the first chip via the AXI bus of the first chip, wherein after the XSPI master terminal of the first chip transmits the encoded AXI information, the XSPI master terminal of the first chip waits for at least one data strobe (DQS) transmitted by the data reception terminal of the second chip, and the at least one DQS and the transmission of the encoded AXI feedback information at least partially overlap in time.

7. The method according to claim 6, wherein:
in response to receiving a specified amount of data, data is transmitted; and
in response to the data reception terminal of the second chip not responding within a specified time, a timeout mechanism is triggered.

8. The method according to claim 6, wherein:
the encoded AXI information includes AXI write, including a write address channel and a write data channel, and AXI read, including a read address channel; and
the encoded AXI feedback information includes AXI write, including a write response channel, and AXI read, including a read data channel.

9. The method according to claim 6, wherein:
in response to transmission time of the data transmission terminal of the first chip exceeding a timeout threshold, the data transmission terminal of the first chip continues to select the data reception terminal of the second chip, stops transmitting clock to the data reception terminal of the second chip, and disconnects transmission after maintaining the timeout threshold.

10. The method according to claim 6, wherein:
in response to the selection signal being selected and a time length for not receiving the clock of the data transmission terminal of the first chip exceeding the timeout threshold, the data reception terminal of the second chip disconnects transmission.

11. A non-transitory computer-readable storage medium stores a computer instruction and, when the computer instruction is executed, a processor is caused to:
perform, by an XSPI master terminal of a first chip, encoding on AXI information of a data transmission terminal of the first chip received via an AXI bus of the first chip and transmits the encoded AXI information to an XSPI slave terminal of a second chip via an XSPI bus;
perform, by the XSPI slave terminal of the second chip, decoding on the encoded AXI information to obtain the AXI information and transmits the AXI information to a data reception terminal of the second chip via an AXI bus of the second chip;
perform, by the XSPI slave terminal of the second chip, encoding on AXI feedback information of the data reception terminal of the second chip received via the AXI bus of the second chip and transmits the encoded AXI feedback information to the XSPI master terminal of the first chip via the XSPI bus; and
perform, by the XSPI master terminal of the first chip, decoding on the encoded AXI feedback information to obtain the AXI feedback information and transmits the AXI feedback information to the data transmission terminal of the first chip via the AXI bus of the first chip, wherein after the XSPI master terminal of the first chip transmits the encoded AXI information, the XSPI master terminal of the first chip waits for at least one data strobe (DQS) transmitted by the data reception terminal of the second chip, and the at least one DQS and the transmission of the encoded AXI feedback information at least partially overlap in time.

12. The storage medium according to claim 11, wherein:
in response to receiving a specified amount of data, data is transmitted; and
in response to the data reception terminal of the second chip not responding within a specified time, a timeout mechanism is triggered.

13. The storage medium according to claim 11, wherein:
the encoded AXI information includes AXI write, including a write address channel and a write data channel, and AXI read, including a read address channel; and
the encoded AXI feedback information includes AXI write, including a write response channel, and AXI read, including a read data channel.

14. The storage medium according to claim 11, wherein:
in response to transmission time of the data transmission terminal of the first chip exceeding a timeout threshold, the data transmission terminal of the first chip continues to select the data reception terminal of the second chip, stops transmitting clock to the data reception terminal of the second chip, and disconnects transmission after maintaining the timeout threshold.

15. The storage medium according to claim 11, wherein:
in response to the selection signal being selected and time length for not receiving the clock of the data transmission terminal of the first chip exceeding the timeout threshold, the data reception terminal of the second chip disconnects transmission.

* * * * *